United States Patent
Park et al.

(10) Patent No.: US 8,941,854 B2
(45) Date of Patent: Jan. 27, 2015

(54) IMAGE FORMING APPARATUS SUPPORTING PEER-TO-PEER CONNECTION AND METHOD OF FORMING IMAGES BY AUTHENTICATING USER THEREOF

(75) Inventors: Jung-jin Park, Suwon-si (KR); Byeong-tak Jo, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 42 days.

(21) Appl. No.: 13/599,213

(22) Filed: Aug. 30, 2012

(65) Prior Publication Data

US 2013/0057897 A1 Mar. 7, 2013

(30) Foreign Application Priority Data

Sep. 2, 2011 (KR) .......................... 10-2011-0089250

(51) Int. Cl.
*G06F 3/12* (2006.01)
*G06K 15/00* (2006.01)
(Continued)

(52) U.S. Cl.
CPC .............. *H04L 63/08* (2013.01); *G06F 21/608* (2013.01); *H04N 1/4433* (2013.01); *H04W 12/06* (2013.01); *G06F 21/44* (2013.01); *G06F 3/1222* (2013.01); *G06F 3/1238* (2013.01);
(Continued)

(58) Field of Classification Search
USPC ............... 358/1.14, 1.1, 1.15, 1.13, 1.6, 3.24; 705/51, 56, 59, 67, 72, 78, 301; 709/204, 217, 227, 208, 201, 220, 223, 709/232, 238, 245; 713/182, 176, 152, 161, 713/163; 707/622, 627, 634, 640, 631, 636, 707/632, 661
See application file for complete search history.

(56) References Cited

U.S. PATENT DOCUMENTS

| 7,257,374 B1 | 8/2007 | Creigh |
| 2003/0156567 A1 | 8/2003 | Oak |

(Continued)

FOREIGN PATENT DOCUMENTS

| EP | 2410512 | 1/2012 |
| JP | 2006-163793 | 6/2006 |

(Continued)

OTHER PUBLICATIONS

Wikipedia, IEEE 802.11 Standard, Aug. 2011, Wikipedia Encyclopedia, IEEE 802.11, All Pages.*

(Continued)

*Primary Examiner* — Ngon Nguyen
(74) *Attorney, Agent, or Firm* — Staas & Halsey LLP

(57) ABSTRACT

A method of performing an image forming operation through a user authentication of an image forming apparatus that supports a peer to peer (P2P) connection includes: receiving and storing user identification information and an image forming operation by the image forming apparatus; receiving a P2P connection request from an external wireless device by the image forming apparatus for a user authentication; receiving device information from the wireless device by the image forming apparatus that is P2P connected to the wireless device, and performing the user authentication by using the received device information and the stored user identification information; and when the user authentication is succeeded, performing the image forming operation by the image forming apparatus.

17 Claims, 11 Drawing Sheets

(51) Int. Cl.
*H04L 29/06* (2006.01)
*G06F 21/60* (2013.01)
*H04N 1/44* (2006.01)
*H04W 12/06* (2009.01)
*G06F 21/44* (2013.01)
*H04W 88/02* (2009.01)

(52) U.S. Cl.
CPC .............. *G06F3/1292* (2013.01); *H04W 88/02* (2013.01); *G06F 3/1267* (2013.01)
USPC ............ 358/1.14; 358/1.1; 358/1.15; 358/1.6

(56) References Cited

U.S. PATENT DOCUMENTS

| | | |
|---|---|---|
| 2005/0078337 A1 | 4/2005 | Ichikawa et al. |
| 2008/0052710 A1* | 2/2008 | Iwai et al. ................ 718/100 |
| 2008/0137121 A1 | 6/2008 | Chrisop et al. |
| 2010/0014111 A1 | 1/2010 | Konno |
| 2011/0026504 A1 | 2/2011 | Feinberg |
| 2011/0085529 A1 | 4/2011 | Choi et al. |
| 2011/0096354 A1* | 4/2011 | Liu ........................... 358/1.15 |

FOREIGN PATENT DOCUMENTS

| | | |
|---|---|---|
| JP | 2006-333247 | 12/2006 |
| JP | 2010-178054 | 8/2010 |
| WO | WO 02/41107 | 5/2002 |
| WO | WO2008/144520 | 11/2008 |

OTHER PUBLICATIONS

"Wi-Fi Certified Wi-Fi Direct", Wi-Fi Alliance, Oct. 2010, 14 pages.
Extended European Search Report dated Dec. 6, 2012, from European Patent Application No. 12182400.7.
Extended European Search Report dated Dec. 6, 2012, from European Patent Application No. 12182398.3.
Extended European Search Report dated Dec. 6, 2012, from European Patent Application No. 12182412.2.
Extended European Search Report dated Dec. 10, 2012, from European Patent Application No. 12182405.6.
Extended European Search Report dated Dec. 13, 2012, from European Patent Application No. 12182403.1.
PCT Notification of Transmittal of the International Search Report and the Written Opinion of the International Searching Authority or the Declaration, mailed Jan. 31, 2013, from PCT Patent Application No. PCT/KR2012/006976.
"Dynamic Host Configuration Protocol", Wikipedia, Edited Aug. 30, 2011 (12 pages).

* cited by examiner

IMAGE FORMING APPARATUS SUPPORTING PEER-TO-PEER CONNECTION AND METHOD OF FORMING IMAGES BY AUTHENTICATING USER THEREOF

CROSS-REFERENCE TO RELATED APPLICATIONS

This application claims the priority benefit of Korean Patent Application No. 10-2011-0089250, filed on Sep. 2, 2011, in the Korean Intellectual Property Office, the disclosure of which is incorporated herein in its entirety by reference.

BACKGROUND

1. Field

Embodiments relate to an image forming apparatus supporting peer to peer (P2P) connection, and more particularly, to a method of performing image forming operations transmitted to an image forming apparatus supporting a P2P connection through a user authentication.

2. Description of the Related Art

Recently, peer to peer (P2P) communication technology, by which wireless devices may be directly connected to each other without an additional wireless connecting apparatus, have been generalized and widely used. For example, Bluetooth® technology makes the P2P communication possible. Although there are limitations in terms of transmission speed and transmission range of Bluetooth®, new versions of Bluetooth® are being developed to compensate for the limitations.

In addition, Wi-Fi, which is a wireless local area network (WLAN) standard based on IEEE 802.11 regulated by the Wi-Fi alliance is basically a technology using ultra-high speed Internet by accessing access points (APs) connected to an infrastructure network; however, the Wi-Fi may serve the P2P communication by using an ad-hoc function. However, when the ad-hoc function is used, security is weakened, a transmission speed is lowered, and a setting method is not easily performed. Therefore, the Wi-Fi alliance has suggested a Wi-Fi Direct technology that makes the P2P communication possible. The Wi-Fi Direct allows P2P connection between wireless devices without using the AP, supports a transmission speed of a maximum of 250 Mbps, and performs security settings by using Wi-Fi protected access 2 (WPA2), in order to address problems of the ad-hoc function. In addition, the Wi-Fi Direct supports a transmission range of a maximum of 200 m, and thus, is considered as a substitute for the P2P communication.

As described above, with the appearance of the Wi-Fi Direct, it is considered that utilization of the P2P communication is increased more. In addition, the P2P communication technology may be also applied to image forming apparatuses such as printers, scanners, facsimiles, and multi-function printers. Therefore, technologies for user authentication, controlling connections, controlling rights, and managing security are necessary for safely and conveniently using image forming apparatuses supporting the P2P connection.

SUMMARY

According to an aspect of one or more embodiments, there is provided a method of performing an image forming operation transmitted to an image forming apparatus, which supports a peer-to-peer (P2P) connection, through a user authentication.

According to an aspect of one or more embodiments, there is provided a method of performing an image forming operation through a user authentication of an image forming apparatus that supports a peer to peer (P2P) connection, the method including: receiving and storing user identification information and an image forming operation by the image forming apparatus; receiving a P2P connection request from an external wireless device by the image forming apparatus for a user authentication; receiving device information from the wireless device by the image forming apparatus that is P2P connected to the wireless device, and performing the user authentication by using the received device information and the stored user identification information; and when the user authentication is succeeded, performing the image forming operation by the image forming apparatus.

The image forming apparatus may function as an access point (AP) that allows clients on a wireless local area network (WLAN) to be connected to each other or may function as a client on the WLAN, and the receiving of the P2P connection request may include receiving the P2P connection request from the wireless device when the image forming apparatus operates as the AP and the wireless device approaches within a predetermined distance from the image forming apparatus.

The method may further include: receiving device information of the wireless device after the image forming apparatus is P2P connected to the wireless device, and generating the user identification information by using the received device information; and notifying the generated user identification information to the user and registering the user identification information in a user information table, before receiving and storing of the user identification information and the image forming operation.

The method may further include: receiving the user identification information and the device information of the wireless device in a state where the image forming apparatus is P2P connected to the wireless device; and registering the received user identification information in the user information table as information corresponding to the device information, before receiving and storing of the user identification information and the image forming operation.

The receiving and storing of the user identification information and the image forming operation may include: determining whether the received user identification information coincides with the user identification information registered in the user information table; and when the received user identification information is equal to the user identification information registered in the user information table, storing the received user identification information and the image forming operation, and when the received user identification information is not equal to the user identification information registered in the user information table, discarding the received user identification information and the image forming operation.

When the user authentication fails, user identification information may be generated by using the device information of the wireless device, and the generated user identification information may be registered in the use information table.

The device information may be unique information of the wireless device.

The user identification information may be equal to the device information.

According to an aspect of one or more embodiments, there is provided an image forming apparatus supporting a peer-to-peer (P2P) connection, the image forming apparatus including: an operation receipt unit receiving user identification information and an image forming operation; an operation storage unit storing the image forming operation; an operation execution unit for performing the stored image forming operation; a communication interface unit for P2P connecting to an external wireless device; a user authentication unit receiving device information from the wireless device that is P2P connected to the communication interface unit and performing a user authentication by using the device information and the user identification information; and a control unit allowing the operation execution unit to perform the image forming operation stored in the operation storage unit, when the user authentication unit succeeds in the user authentication.

The image forming apparatus may function as an access point (AP) that allows clients on a wireless local area network (WLAN) to be connected to each other or may function as a client on the WLAN, and the communication interface unit may receive a P2P connection request from the wireless device when the image forming apparatus operates as the AP and the wireless device approaches within a predetermined distance from the image forming apparatus.

The image forming apparatus may further include a user identification information generation unit receiving the device information from the wireless device that is P2P connected to the communication interface unit and generating the user identification information by using the device information.

The image forming apparatus may further include a user information table, in which the user identification information generated by the user identification information generation unit is registered.

The image forming apparatus may further include a user identification information check unit determining whether the user identification information received by the operation receipt unit is registered in the user information table, storing the received image forming operation in the operation storage unit when the user identification information is registered in the user information table, and discarding the image forming operation when the user identification information is not registered in the user information table.

The image forming apparatus of claim 13, wherein when the user authentication unit fails the authentication of the user, the user identification information generation unit may generate the user identification information by using the device information of the wireless device that is P2P connected to the communication interface unit and may register the user identification information in the user information table.

The image forming apparatus may further include a user interface unit displaying the user identification information generated by the user identification information generation unit or receiving the user identification information.

The device information may be unique information of the wireless device.

The user identification information may be equal to the device information.

According to an aspect of one or more embodiments, there is provided at least one non-transitory computer readable medium storing computer readable instructions to implement one or more methods of embodiments.

BRIEF DESCRIPTION OF THE DRAWINGS

The above and other features and advantages will become more apparent by describing in detail embodiments thereof with reference to the attached drawings in which.

DETAILED DESCRIPTION

Embodiments will now be described more fully hereinafter with reference to the accompanying drawings, in which illustrative embodiments are shown. However, embodiments may be embodied in many different forms and should not be construed as limited to embodiments set forth herein; rather, these embodiments are provided so that this disclosure will be thorough and complete, and will fully convey the scope of the disclosure to those of ordinary skill in the art. Like numbers refer to like elements throughout.

Hereinafter, a multi-function printer (MFP) that supports Wi-Fi Direct will be described as an example of an image forming apparatus supporting a peer-to-peer (P2P) connection. However, the scope of the disclosure to be protected is not limited thereto.

Before describing embodiments, a basic connections and operations of an MFP that supports the Wi-Fi Direct will be described with reference to accompanying drawings.

Figure 1:
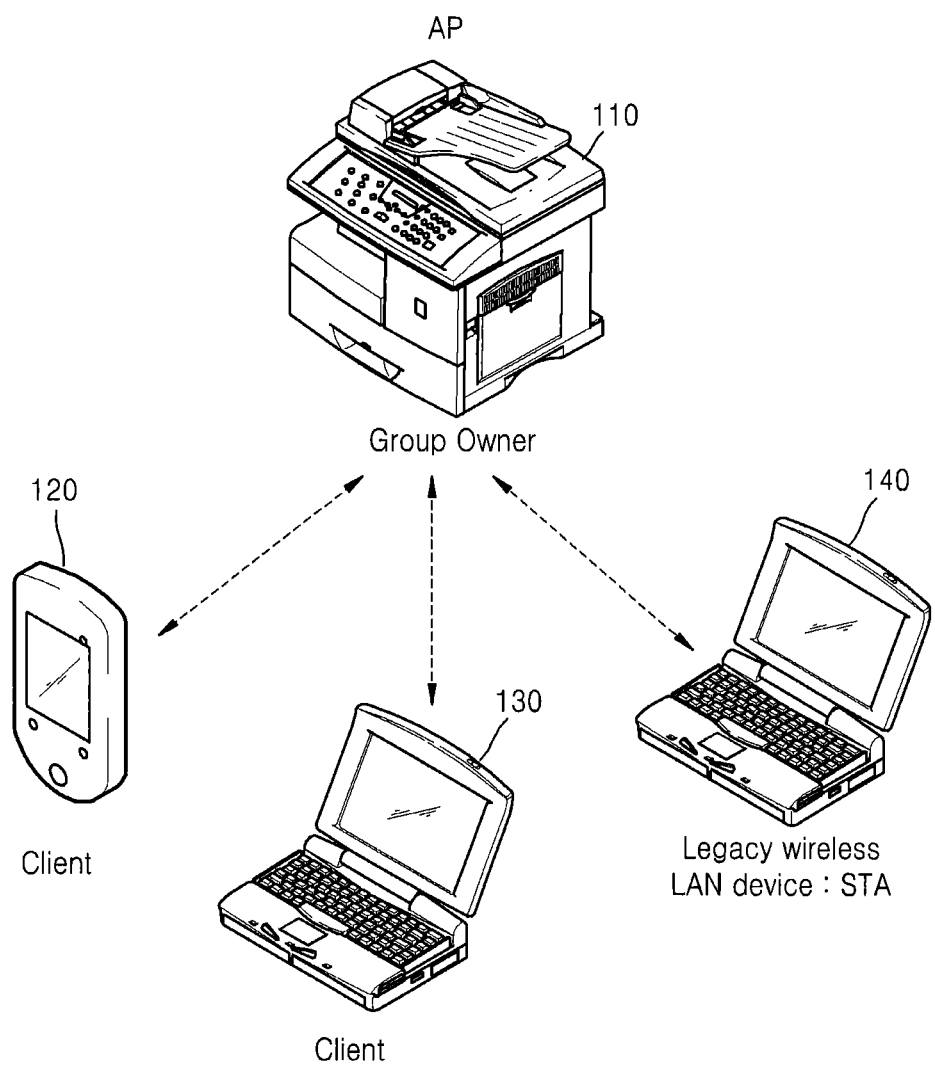
FIG. 1 is a diagram showing devices supporting Wi-Fi Direct and legacy wireless local area network (WLAN) devices that are wirelessly connected to each other to form a wireless network.

FIG. 1 is a diagram showing wireless local area network (WLAN) devices supporting Wi-Fi Direct and a legacy WLAN device connecting to each other to form a wireless network. Referring to FIG. 1, an MFP 110 supporting the Wi-Fi Direct is wirelessly connected to a smartphone 120 supporting the Wi-Fi Direct, a laptop computer 130 supporting the Wi-Fi Direct, and a legacy WLAN laptop computer 140. Here, the legacy WLAN laptop computer 140 denotes a conventional laptop computer which adopts a WLAN technology and does not support the Wi-Fi Direct.

The WLAN device supporting the Wi-Fi Direct (hereinafter, referred to as "Wi-Fi Direct device") may perform a P2P connection without using an infrastructure network, unlike conventional devices supporting Wi-Fi. In more detail, according to the conventional Wi-Fi technology, a Wi-Fi device is wirelessly connected to a router, that is, an access point (AP), connected to an infrastructure network that is configured in advance in order to form a wireless network. Here, the Wi-Fi devices, which are wirelessly connected to the AP, function as stations. However, according to Wi-Fi Direct technology, one of the Wi-Fi Direct devices that are to form the wireless network operates as an AP, and the other Wi-Fi Direct devices are wirelessly connected to the Wi-Fi Direct device that operates as the AP to operate as stations. Therefore, the wireless network may be formed between the Wi-Fi direct devices without the AP connected to the infra-structured network. In addition, when the wireless network is formed between the Wi-Fi direct devices, the legacy WLAN devices such as the Wi-Fi devices may recognize the Wi-Fi direct device operates as the AP as an AP and may be wirelessly connected to the Wi-Fi direct device.

Referring to FIG. 1, the Wi-Fi Direct MFP 110, the Wi-Fi Direct smartphone 120, and the Wi-Fi Direct laptop computer 130 that are the Wi-Fi direct devices form a wireless network without an AP connected to the infrastructured network. As described above, the Wi-Fi direct devices may be wirelessly connected to each other to form a P2P group without an AP connected to the infrastructured network. Here, the Wi-Fi Direct MFP 110 operates as the AP, and the device operating as the AP among the Wi-Fi direct devices is referred to as a group owner (GO) of a P2P group. In addition, the Wi-Fi smartphone 120 and the Wi-Fi Direct laptop computer 130 are wirelessly connected to the GO, that is, the Wi-Fi Direct MFP 110, to operate as the stations, which are referred to as clients. On the other hand, the legacy WLAN laptop computer 140 that does not support the Wi-Fi Direct recognizes the GO, that is, the Wi-Fi Direct MFP 110, as the AP, and is wirelessly connected to the GO to be connected to the wireless network formed by the Wi-Fi direct devices.

In FIG. 1, the Wi-Fi Direct MFP 110 operates as the GO; however, any one of the other Wi-Fi direct devices, that is, the smartphone 120 and the laptop computer 130, may operate as the GO and the MFP 110 may operate as the client. Which of the Wi-Fi direct devices to become the GO is determined through a negotiation process in Wi-Fi direct connection processes, and this will be described in detail later. In addition, the Wi-Fi direct device may be the GO by itself before the connection without any negotiation, and the Wi-Fi direct device in this case is referred to as an autonomous group owner (AGO). In addition, a wireless network formed based on the AGO is referred to as an autonomous P2P group. When the autonomous P2P group is formed, the legacy WLAN device may recognize the AGO as an AP connected to the infrastructure network and may be connected to the AGO.

Although FIG. 1 shows an example in which the Wi-Fi direct devices form the P2P group without the AP connected to the infrastructured network, the Wi-Fi direct devices may operate as the stations by connecting to the AP, if the AP is connected to the infrastructured network.

Hereinafter, wireless connecting processes between the Wi-Fi direct devices and characteristics of the Wi-Fi Direct technology will be described with reference to the accompanying drawings. For convenience of description, an MFP supporting the Wi-Fi Direct (hereinafter, referred to as "Wi-Fi Direct MFP") will be described as an example; however, the scope of the disclosure is not limited thereto, that is, embodiments may be applied to printers, scanners, or facsimiles supporting the Wi-Fi Direct. In addition, the Wi-Fi Direct is used as an example of the P2P communication method; however, other kinds of P2P communication such as Bluetooth® and Zigbee® may be used.

Figure 2:
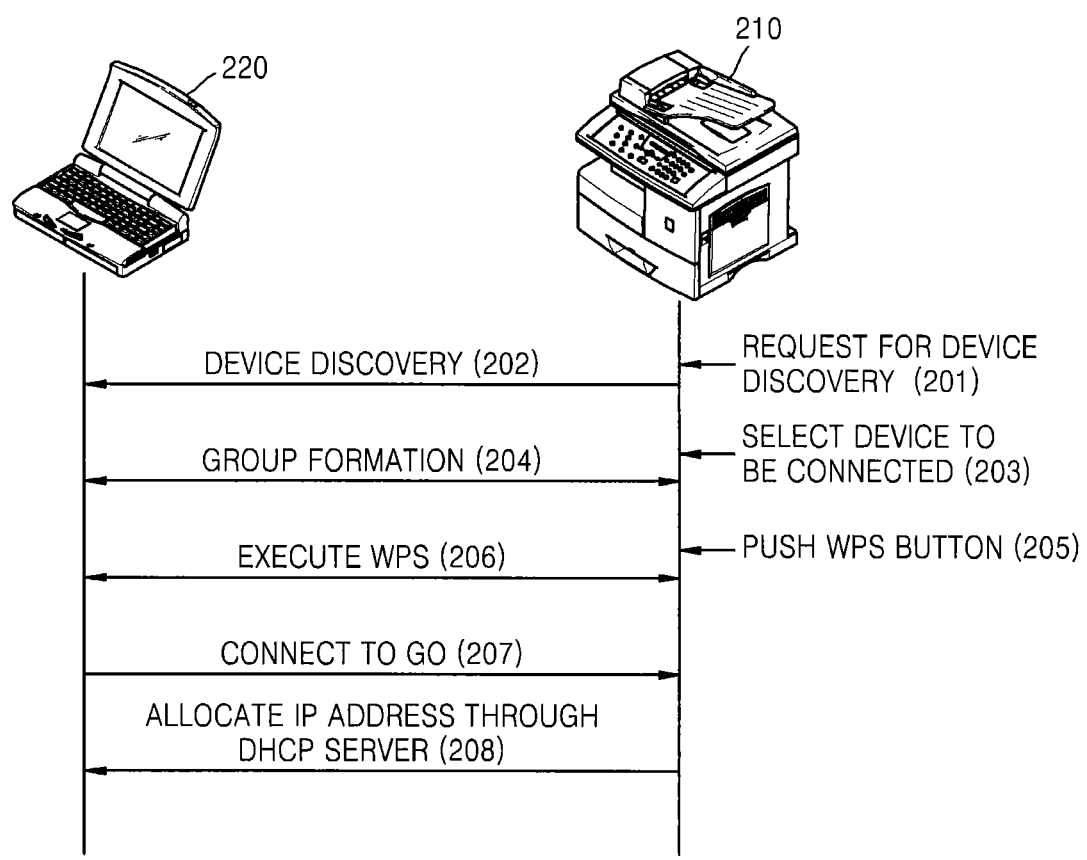
FIG. 2 is a diagram showing processes of wirelessly connecting the devices supporting the Wi-Fi Direct to each other.

FIG. 2 is a diagram showing processes of wirelessly connecting Wi-Fi Direct devices to each other. In more detail, processes of Wi-Fi Direct connection between a Wi-Fi Direct MFP 210 and a Wi-Fi Direct laptop computer 220 are shown. The Wi-Fi Direct connecting processes may be divided as a device discovery process, a group formation process, and a secure connection process. Referring to FIG. 2, the Wi-Fi Direct MFP 210 receives a request for device discovery from a user (201), and searches for a Wi-Fi Direct device around it (202). The device discovery request may be input through a user interface of the MFP 210, for example, a user interface realized on a display unit such as a liquid crystal display (LCD) formed in the MFP 210. If it is determined as a result of searching that there is a Wi-Fi Direct device around the MFP 210, the MFP 210 shows the user the searched device through the display unit and receives a connection request 203 from the user. The connection request 203 may be also input through the display unit of the MFP 210 from the user, for example, the user may push buttons or a touch panel of the display unit. If there is a plurality of Wi-Fi Direct devices, the MFP 210 displays a list of the searched Wi-Fi direct devices on the display unit so that the user may select one of the Wi-Fi direct devices and request the connection to the selected Wi-Fi direct device.

After receiving the connection request 203, a group formation is performed between the Wi-Fi Direct devices to be connected (204). The group formation process determines the Wi-Fi Direct devices to be connected to each other and determines the Wi-Fi direct devices to be the GO or the clients in the group. The Wi-Fi Direct device to be the GO is determined through the negotiation between the Wi-Fi Direct devices, and the negotiation will be described in detail with reference to FIG. 4.

When the group is formed, the devices included in the group are to be securely connected to each other by using a Wi-Fi protected setup (WPS) technology. The WPS denotes a function of performing simple secure connection between the Wi-Fi supporting devices. The WPS may be classified as a personal identification number (PIN) type WPS and a push button configuration (PBC) type WPS. The PIN type WPS sets the secure connection by inputting a PIN code that is set in advance, and the PBC type WPS sets the secure connection by pushing a WPS button that is provided on the Wi-Fi Direct device.

Hereinafter, the PBC type WPS will be described as an example. The user pushes a WPS button provided on the MFP 210 to request the secure connection (205). In addition, within a predetermined period of time (in general, 120 seconds), the secure connection may be achieved by pushing a WPS button formed on the laptop computer 220, or a WPS button realized on an application program for Wi-Fi Direct connection in the laptop computer 220. The WPS button realized on the application program for the Wi-Fi Direct connection in the laptop computer 220 may be an object represented on a display unit of the laptop computer 220 by the application program for the Wi-Fi Direct connection. A detailed example of the WPS button is represented as reference numeral 510 in FIG. 5. The user clicks the WPS button represented on the display unit of the laptop computer 220 by using a mouse, for example, to request the secure connection. When the security connection is requested by pushing the WPS button, the device that is determined to be the GO in the group formation process transmits security information to devices determined as the clients (206). According to the Wi-Fi Direct, the secure connection is executed after encrypting in a Wi-Fi protected access 2 (WPA2)-pre-shared key (PSK) method, and thus, the Wi-Fi Direct may have a higher security function than that of a conventional wired equivalent privacy (WEP) or Wi-Fi protected access (WAP) method.

When the WPS is executed, the Wi-Fi direct device that is the client is connected to the Wi-Fi direct device that is the GO (207). At this time, the Wi-Fi Direct device that is the GO automatically allocates an Internet protocol (IP) address to the Wi-Fi direct device that is the client by using a dynamic host configuration protocol (DHCP) server (208), and then, the P2P connection between the Wi-Fi Direct devices is completed.

Basic processes for connecting the Wi-Fi direct devices have been described so far, and detailed processes and characteristics of the Wi-Fi Direct technology will be described with reference to the accompanying drawings as follows.

Figure 3:
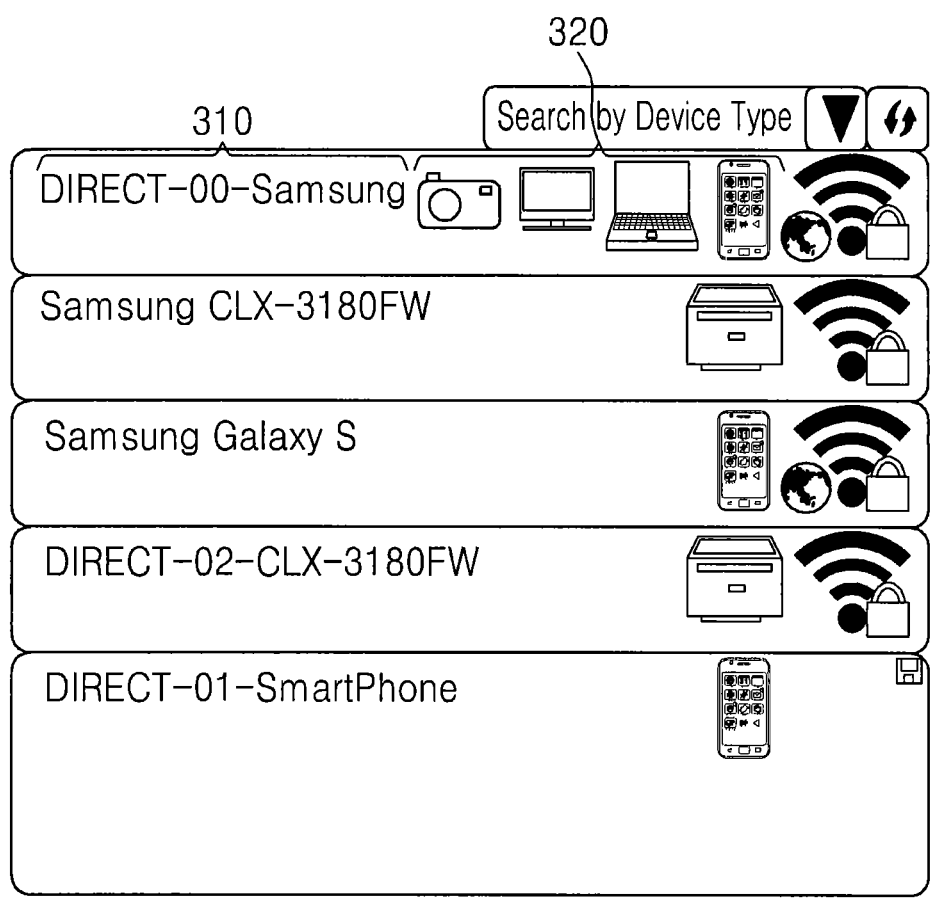
FIG. 3 is a diagram showing an example of displaying a list of Wi-Fi Direct devices that are found after a device discovery process performed by a device supporting the Wi-Fi Direct.

FIG. 3 is a diagram showing an example of displaying a list of the Wi-Fi Direct devices that are searched in the device discovery process in the Wi-Fi Direct device. When the device discovery process is performed by the Wi-Fi direct device, device information such as a type of the device and a service set identifier (SSID) of the device is exchanged between the devices through a probe request and a probe response that are WLAN packets, and the Wi-Fi direct device that performs the device discovery process displays the collected information. As shown in FIG. 3, the SSIDs and the types of the searched Wi-Fi Direct devices are represented as text 310 or icons 320. Here, all of the searched devices may be represented in the list; however, the devices may be filtered so that the devices of a desired type may be only displayed in the list. According to the Wi-Fi Direct technology, the Wi-Fi direct devices are defined in category units. The Wi-Fi Direct devices may be classified as categories, for example, computers, input devices, printers, scanners, facsimiles, copying machines, and cameras, and each of the categories is divided into sub-categories. For example, the computer may be classified as personal computers (PCs), servers, laptop computers, and the like.

Figure 4:
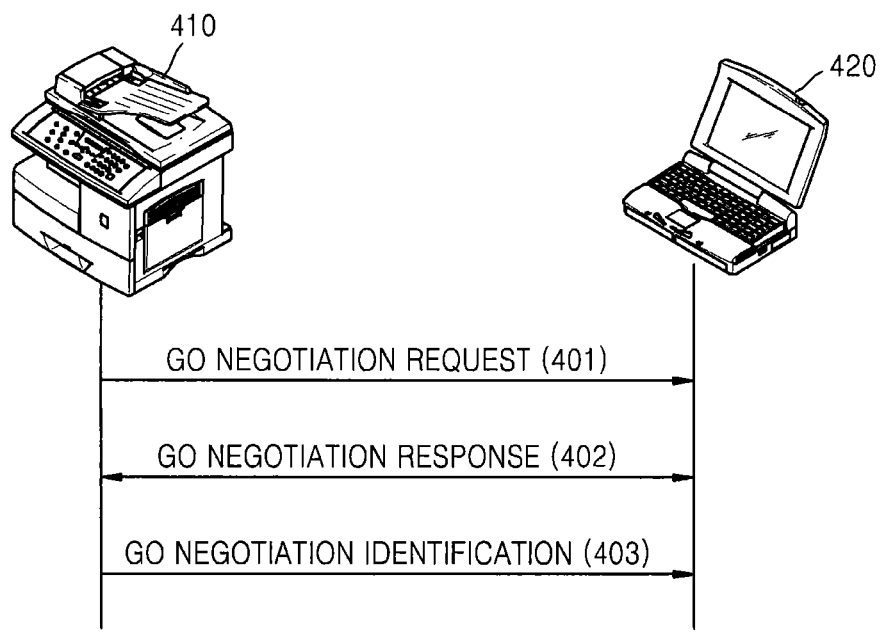
FIG. 4 is a diagram showing a group formation process in the processes of connecting the Wi-Fi Direct supporting devices to each other.

FIG. 4 is a diagram showing the group formation process in detail among the connecting processes between the Wi-Fi Direct devices. The group formation process is a process for determining the Wi-Fi Direct devices that are to form a network, and the Wi-Fi Direct devices to be the GO and the clients. For example, when the Wi-Fi direct MFP 410 performs the device discovery and selects a laptop computer 420 among the discovered Wi-Fi Direct devices to be connected, the MFP 410 transmits a GO negotiation request to the laptop computer 420 (401). The laptop computer 420 receiving the GO negotiation request compares an intent value thereof with that of the MFP 410, and then, determines the MFP 410 as the GO when the intent value of the MFP 410 is greater than that of the laptop computer 420 and determines the laptop computer 420 as the GO when the intent value of the laptop computer 420 is greater. Here, the intent value is a value representing a degree of task intent in each device, and is determined by manufacturer policy and user settings. The intent value of the device, which is supplied power always, may be set to be relatively high. As described above, after determining the Wi-Fi Direct device to be the GO by comparing the intent values, the laptop computer 420 transmits the determination result to the MFP 410 as a response to the GO negotiation (402). The MFP 410 that receives the determination result transmits an acknowledgement to the laptop computer 420 (403) in order to verify the receipt of the negotiation, and then, the group formation process is finished. When the group formation is completed, the Wi-Fi Direct device that is the GO manages security information and SSIDs of the other Wi-Fi Direct devices included in the group.

Figure 5:
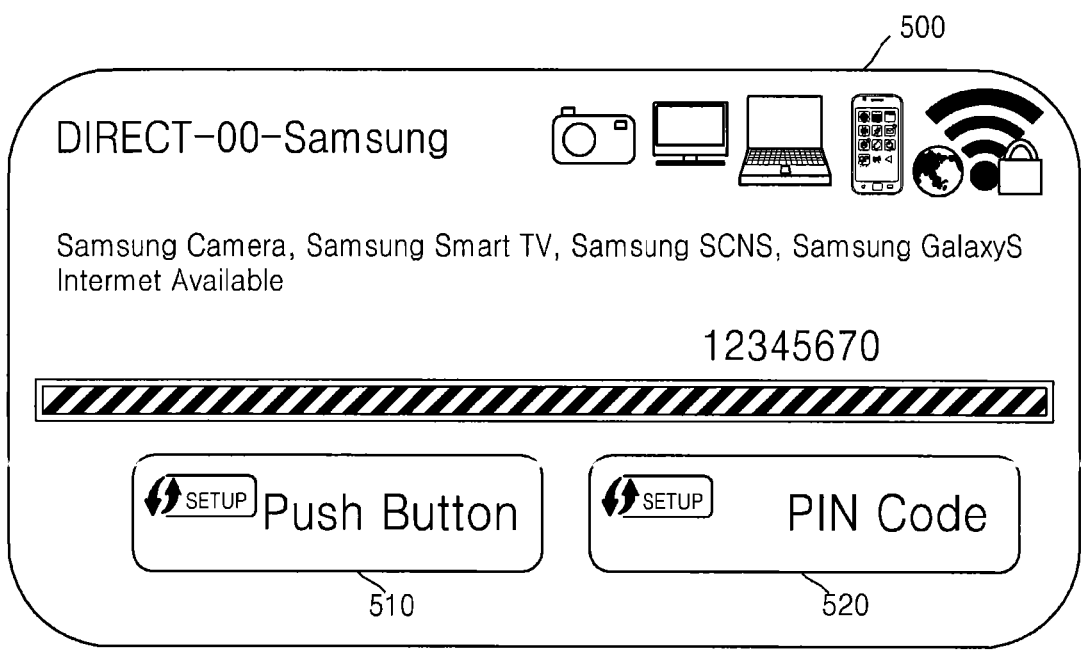
FIG. 5 is a diagram showing a display screen for executing WPS.

When the group is formed, the Wi-Fi Direct devices included in the group are securely connected to each other through the WPS. FIG. 5 is a diagram showing a display screen 500 for executing the WPS. The screen of FIG. 5 may be displayed on a display unit of the Wi-Fi Direct MFP. Referring to FIG. 5, the user may select one of a WPS button 510 and a PIN code 520 for executing the WPS. When the WPS is executed through the WPS button 510, the WPS button 510 of the Wi-Fi Direct MFP is pushed and WPS buttons of other devices are pushed within a predetermined period of time, and then, security information is exchanged between the devices automatically and the secure connection is made. Here, the Wi-Fi Direct device that is the GO provides security information to the Wi-Fi direct devices that are the clients. In addition, the secure connection is performed after encrypting in the WPA2-PSK verification method, and thus, high security may be achieved.

Figure 6:
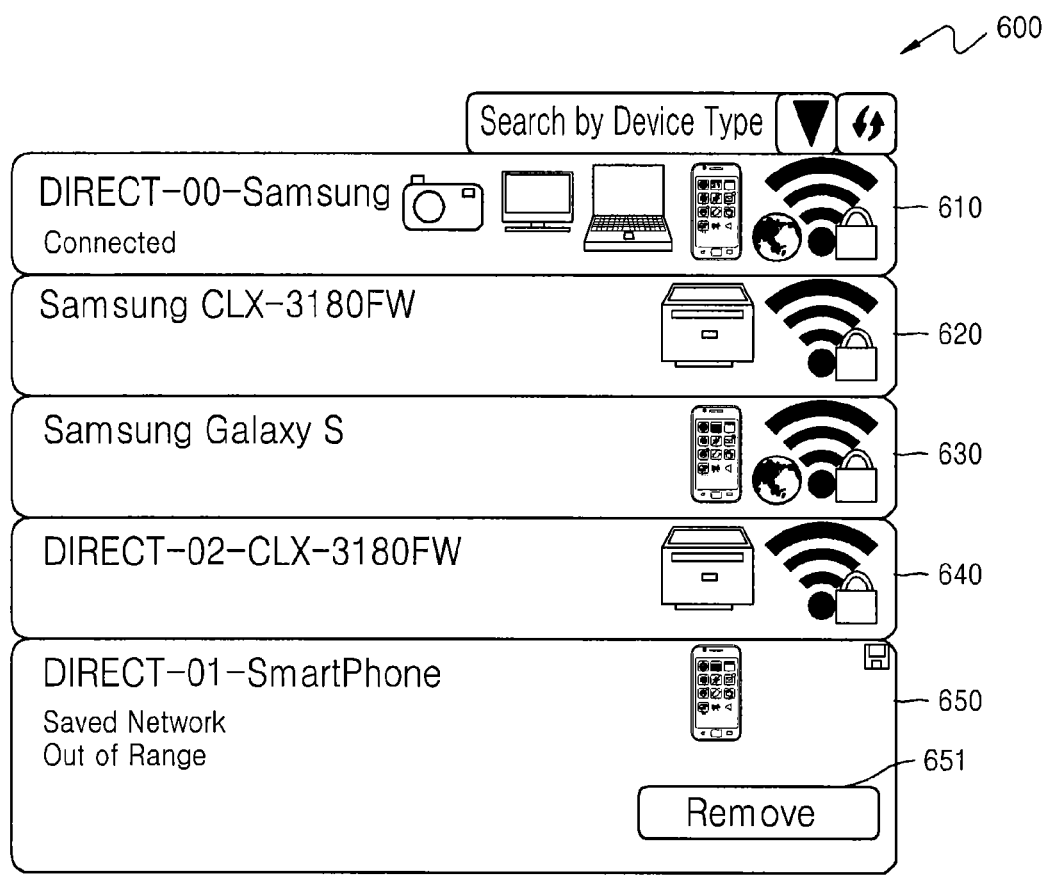
FIG. 6 is a diagram showing a list of devices, information of which is stored, supporting Wi-Fi Direct according to a profile storing function.

The Wi-Fi Direct devices have a profile storage function that is for storing information of the Wi-Fi Direct devices connected once thereto. FIG. 6 is a diagram showing a list of the Wi-Fi Direct devices, information of which is stored according to the profile storage function. The list of FIG. 6 is a screen displayed on the display unit of the Wi-Fi Direct MFP. Information of a first list 610 denotes a Wi-Fi Direct device currently connected to the Wi-Fi Direct MFP, information of second through fourth lists 620-640 denotes Wi-Fi Direct devices that are not currently connected to the Wi-Fi Direct MFP, but are included in a device discovery range of the Wi-Fi Direct MFP, and information of a fifth list 650 denotes a Wi-Fi Direct device that has been connected at least once to the Wi-Fi Direct device although that is not discovered currently. If the information of the fifth list 650 is not necessary, the user may delete the fifth list 650 by pushing a remove button 651. Since the Wi-Fi direct device has the profile storage function as described above, the Wi-Fi Direct device stores information of the other Wi-Fi Direct devices connected at least once thereto, and then, may be connected fast without executing the WPS by using the stored information in a case where the same device tries to connect thereto again.

Figure 7:
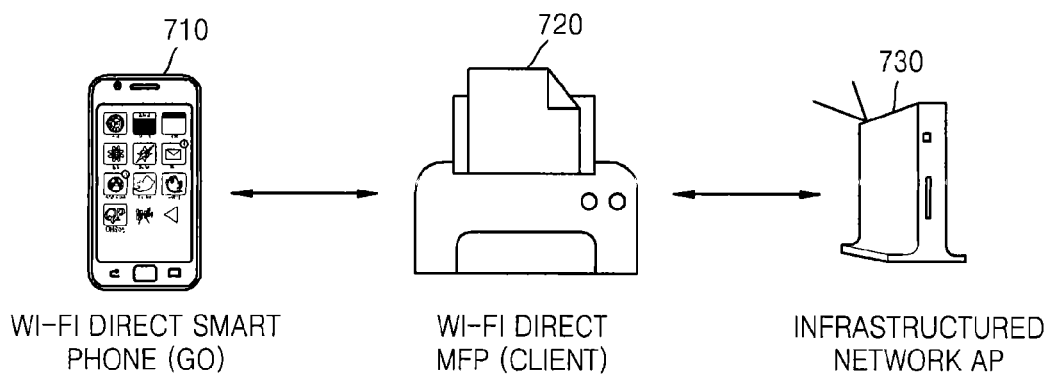
FIG. 7 is a diagram showing Wi-Fi Direct supporting devices that are simultaneously connected to each other.

The Wi-Fi Direct device may be P2P connected to another Wi-Fi direct device, and at the same time, may be connected to the infrastructured network, which is referred to as a concurrent connection. FIG. 7 is a diagram showing the Wi-Fi Direct devices that are in the concurrent connection states. Referring to FIG. 7, the Wi-Fi direct MFP 720 is P2P connected to a smartphone 710 that is another Wi-Fi direct device, and at the same time, the Wi-Fi Direct MFP 720 is also connected to an AP 730 of the infrastructured network. The Wi-Fi Direct MFP 720 may directly transmit/receive print data to/from the smartphone 710, and at the same time, may directly transmit/receive print data to/from the infrastructured network through the AP 730 of the infrastructured network.

When the Wi-Fi direct device is concurrently connected to the Wi-Fi Direct device and the infrastructured network as shown in FIG. 7, or when the Wi-Fi Direct device is wired connected to the infrastructured network and P2P connected to another Wi-Fi direct device, different IP addresses and MAC addresses with respect to the connections, that is, the connection to the infrastructured network and the connection to the another Wi-Fi Direct device, may be used. Through a multi-homing technology, the Wi-Fi Direct device may provide the devices with different services from each other. For example, the Wi-Fi Direct MFP may provide services of all functions of the MFP through an interface connected to the infrastructured network; however, the Wi-Fi Direct MFP may provide services of partial functions of the MFP through an interface connected to another Wi-Fi Direct device.

Figure 8:
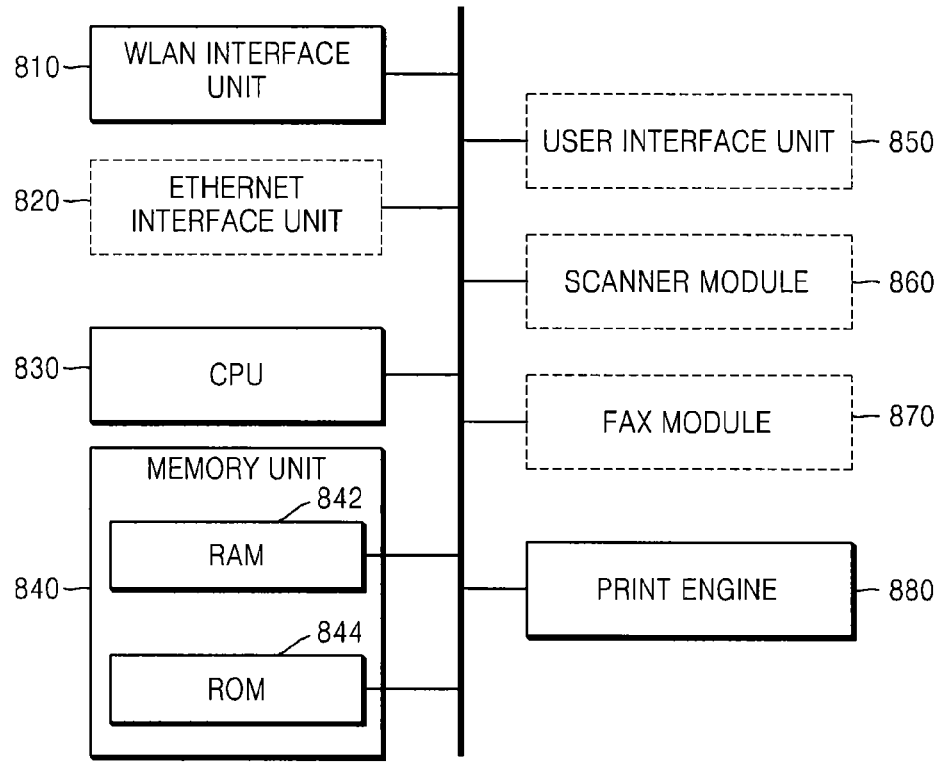
FIG. 8 is a block diagram showing a hardware configuration of a multi-function printer supporting the Wi-Fi Direct according to an embodiment.

FIG. 8 is a block diagram showing a hardware configuration of the Wi-Fi Direct MFP. Referring to FIG. 8, the Wi-Fi Direct MFP may include a WLAN interface module 810, an Ethernet interface module 820, a central processing unit (CPU) 830, a memory unit 840, a user interface module 850, a scanner module 860, a fax module 870, and a print engine 880. In addition, the memory unit 840 may include a random access memory (RAM) 842 and a read only memory (ROM) 844. If the MFP only supports the WLAN, the MFP may not include the Ethernet interface module 820. In addition, if the device is a printer, rather than the MFP, the scanner module 860 and the fax module 870 are not necessary.

The WLAN interface module 810 is hardware performing IEEE 802.11b/g/n function, and may communicate with a main board, on which the CPU 830 is mounted, of the MFP via a universal serial bus (USB). The Ethernet interface module 820 is hardware for performing wired Ethernet communication according to IEEE 802.3. The CPU 830 controls overall operations of the MFP, and the memory unit 840 stores information for controlling the MFP and the print data to be read when it is necessary. The user interface module 850 functions as a medium for the user to identify information of the MFP and to input commands into the MFP. The user interface module 850 may be variously modified according to products, for example, may be configured as two or four lines displayed on a display unit such as an LCD or a light emitting diode (LED), or may be realized as a graphic user interface (UI) so as to represent various graphics. The scanner module 860, the fax module 870, and the print engine 880 are hardware for performing functions of a scanner, a facsimile, and a printer.

Figure 9:
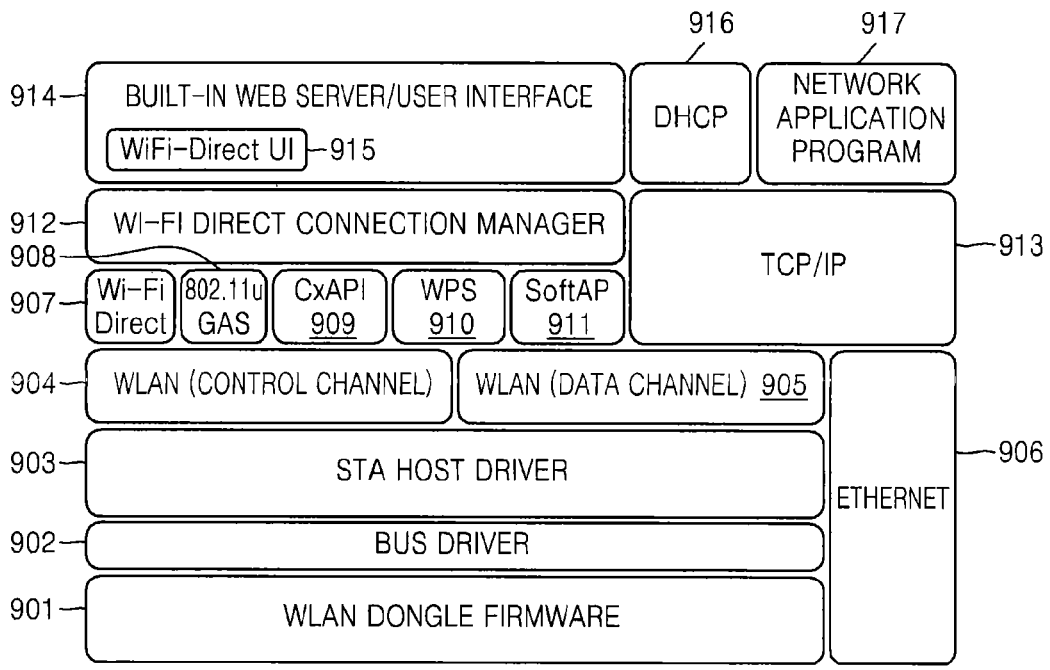
FIG. 9 is a block diagram showing a software configuration of the multi-function printer supporting the Wi-Fi Direct of FIG. 8.

FIG. 9 is a block diagram showing software configuration of the Wi-Fi Direct MFP. The configuration of the software in the Wi-Fi Direct MFP will be described with reference to FIG. 9 as follows.

A WLAN dongle firmware 901 is a firmware for connecting the WLAN, and may be stored in WLAN dongle hardware or may be transmitted to the WLAN dongle hardware from a main board of the MFP when booting the MFP. A bus driver 902 and a station (STA) host driver 903 are low level bus drivers for communicating with the WLAN hardware. A WLAN controlling channel 904 and a WLAN data channel 905 are channels for communicating with the WLAN firmware. A Wi-Fi Direct module 907 performs the Wi-Fi Direct connection and transmits an operating command to the WLAN firmware. An IEEE 802.11u generic advertisement service (GAS) module 908 performs functions according to IEEE 802.11u GAS, and a WPS module 910 performs a WPS function. A soft AP module 911 is a software module allowing the MFP to perform as the AP. A transmission control protocol (TCP)/IP 913 is a standard protocol for network transmission. A Wi-Fi Direct connection manager 912 is a module for controlling the Wi-Fi Direct connection. A Wi-Fi Direct user interface 915 allows the user to perform settings related to the Wi-Fi Direct, and may be included in a user interface 914 that is installed in an embedded web server (EWS). A DHCP server 916 automatically allocates an IP to the Wi-Fi Direct device that is connected as a client. A network application program 917 performs various application operations relating to the network.

The above-described Wi-Fi Direct technology has the following advantages.

The Wi-Fi Direct device may be connected to other devices whenever and wherever, and thus, has maximum mobility and portability. If a new Wi-Fi Direct device is added, the Wi-Fi Direct device may be directly connected to the new Wi-Fi direct device. In addition, it may be identified whether there is an available device or service before setting the connection to other devices, and thus, the Wi-Fi direct devices may be conveniently used. In addition, the connection may be performed simply and stably by a simple operation, for example, pushing a WPS button, and the connection may be performed with high security functions by using the WPA2 technology.

In addition, the Wi-Fi Direct technology may provide various functions that may not be provided by the conventional WLAN technology.

For example, the device discovery function for searching for peripheral Wi-Fi Direct devices by the device type unit, the service discovery function that may search for services provided by the peripheral Wi-Fi Direct devices, a power management function that may effectively use electric power, the concurrent connection function that may form the P2P connection between the Wi-Fi Direct devices while connecting to the conventional infrastructure network, a function of separating a security domain between the infrastructured network connection and the Wi-Fi Direct connection, and a cross connection function for sharing an Internet connection may be provided by the Wi-Fi Direct technology.

In addition, since the Wi-Fi Direct technology is based on the conventional WLAN technology, that is, IEEE 802.11, the Wi-Fi Direct devices may be compatible with conventional legacy WLAN devices.

Hereinafter, a Wi-Fi Direct MFP and a method of performing an image forming operation through a user authentication of the Wi-Fi Direct MFP, according to an embodiment, will be described in detail with reference to FIGS. 10 through 15.

Figure 10:
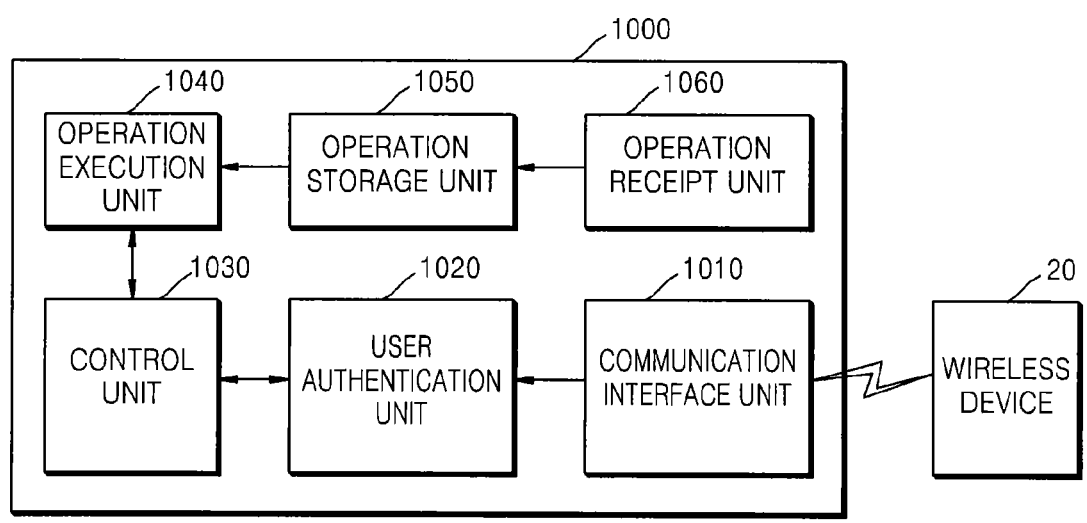
FIG. 10 is a block diagram of a detailed hardware configuration of the multi-function printer supporting the Wi-Fi Direct, shown in FIG. 8.
Figure 11:
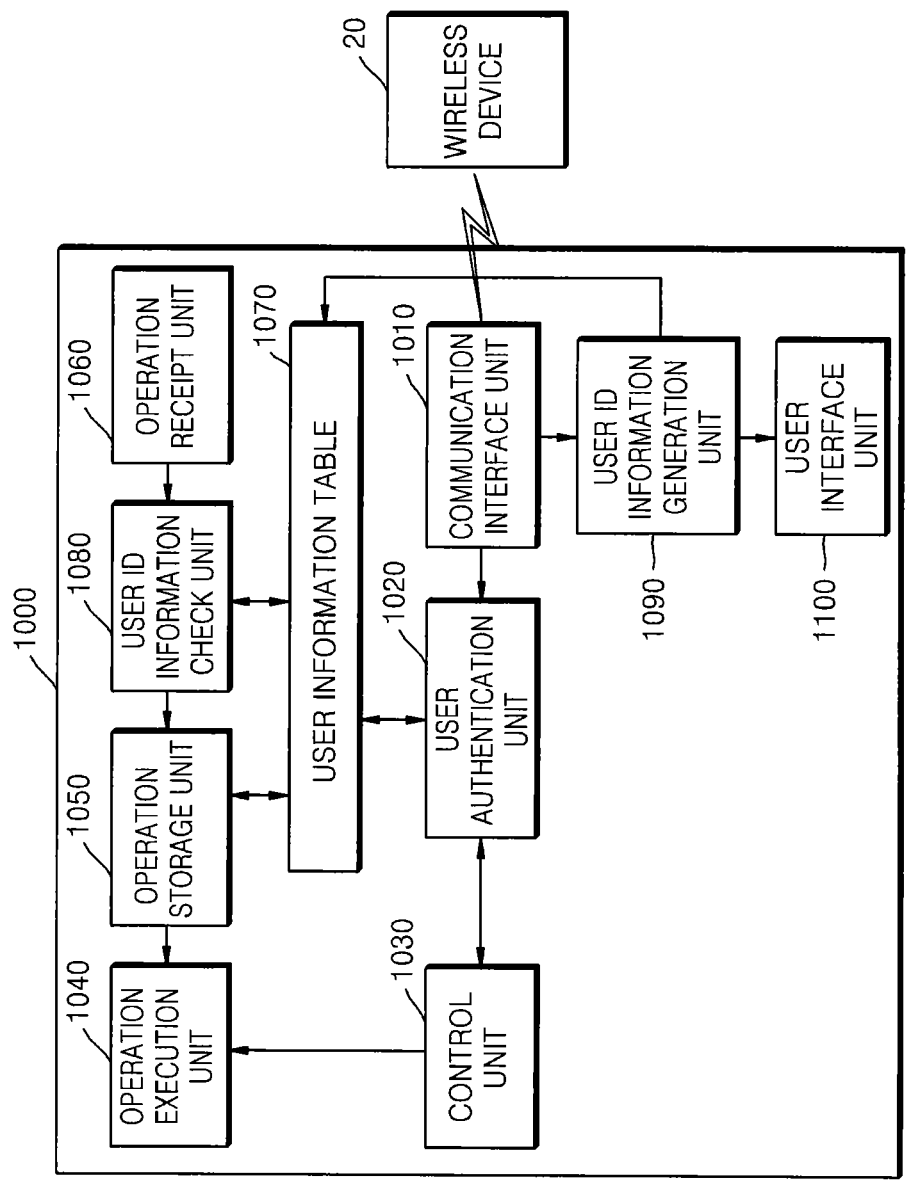
FIG. 11 is a block diagram of a detailed hardware configuration of the multi-function printer supporting the Wi-Fi Direct according to an embodiment.

FIG. 10 is a detailed block diagram of a Wi-Fi Direct MFP 1000 according to an embodiment. Referring to FIG. 10, the Wi-Fi Direct MFP 1000 of an embodiment may include a communication interface unit (communication interface) 1010, a user authentication unit (user authenticator) 1020, a control unit (controller) 1030, an operation execution unit (operation executor) 1040, an operation storage unit 1050, and an operation receipt unit (operation receiver) 1060. FIG. 11 is a detailed block diagram showing hardware configuration of the Wi-Fi Direct MFP 1000 according to an embodiment. Referring to FIG. 11, the Wi-Fi Direct MFP 1000 may additionally include a user information table 1070, a user identification (ID) information check unit (user identification checker) 1080, a user ID information generation unit (user identification generator) 1090, and a user interface unit (user interface) 1100, in addition to the components shown in FIG. 10. Featured components, which are necessary in executing the method of performing an image forming operation through user authentication, of the Wi-Fi Direct MFP 1000 are only shown in FIGS. 10 and 11 under the assumption that the basic hardware configuration of the Wi-Fi Direct MFP shown in FIG. 8 is included in the Wi-Fi Direct MFP 1000. For example, the communication interface unit (communication interface) 1010 of FIG. 10 corresponds to a WLAN interface unit 810 of FIG. 8, the user authentication unit (user authenticator) 102, the control unit (controller) 1030, and the operation execution unit (operation executor) 1040 of FIG. 10 are included in the CPU 830 of FIG. 8, and the operation storage unit 1050 of FIG. 10 is a space for storing the image forming operation in the memory unit 840 of FIG. 8. The operation receipt unit (operation receiver) 1060 of FIG. 10 may be included in one of the WLAN interface unit 810 or the Ethernet interface unit 820 of FIG. 8. In addition, the user information table 1070 of FIG. 11 is a space for storing user information in the memory unit (memory) 840 of FIG. 8, the user ID information generation unit 1090 of FIG. 11 is included in the CPU 830 of FIG. 8, and the user interface unit (user interface) 1100 of FIG. 11 corresponds to the user interface unit 850 of FIG. 8. Besides, basic components of the MFP such as the print engine 880, the fax module 870, and the scanner module 860 shown in FIG. 8 are not shown in FIGS. 10 and 11. Functions and operations of the components in the MFP 1000 shown in FIGS. 10 and 11 will be described as follows.

FIGS. 12 through 15 are flowcharts illustrating a method of performing an image forming operation through user authentication of the Wi-Fi Direct MFP according to the embodiment.

A case where the MFP 1000 does not include the user information table 1070 will be described with reference to FIGS. 10 and 12. The operation receipt unit 1060 of the MFP 1000 receives wired or wirelessly an image forming operation and a user ID information, and stores the operation storage unit 1050 (S1201). When the MFP 1000 operates as the GO of the P2P group and a wireless device 20 supporting the Wi-Fi Direct approaches around the MFP 1000, the communication interface unit 1010 of the MFP 1000 may receive a Wi-Fi Direct connection request from the wireless device 20 (S1203). When the communication interface unit 1010 receives the connection request from the wireless device 20 supporting the Wi-Fi Direct, the user authentication unit 1020 receives device information of the wireless device 20 through the Wi-Fi Direct device discovery and may perform the user authentication by comparing the received device information with the user ID information stored in the operation storage unit 1050 (S1205). For example, if the user transmits a host name of the wireless device 20 as the user ID information with the image forming operation, the user authentication unit 1020 may acquire the host name of the wireless device 20 when the Wi-Fi Direct connection request is transmitted from the wireless device 20, and accordingly, the user authentication may be performed by comparing the acquired host name of the wireless device 20 with the stored user ID information. In addition, it is determined whether the user authentication successes (S1207), and if the user authentication succeed, the control unit 1030 allows the operation execution unit 1040 to perform the image forming operation stored in the operation storage unit 1050 (S1209).

Figure 13:
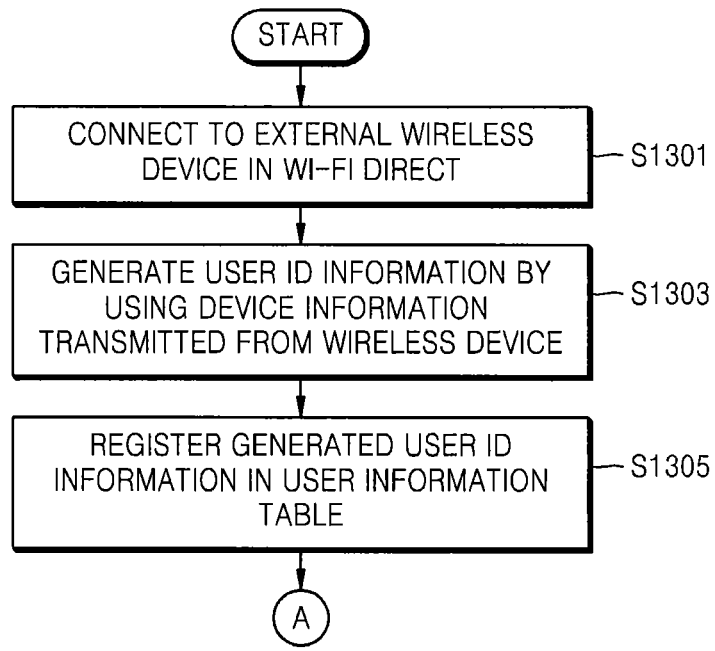

FIG. 13 is a flowchart illustrating processes of generating the user ID information through a Wi-Fi Direct connection between the MFP 1000 and the wireless device 20 in advance. The processes of generating the user ID information shown in FIG. 13 will be described with reference to FIGS. 11 and 13. The MFP 1000 is Wi-Fi Direct connected to the external wireless device 20 (S1301). In detail, the MFP 1000 and the wireless device 20 are connected to each other in the Wi-Fi Direct through the connection processes shown in FIG. 2, and the MFP 1000 becomes the GO through the group formation process shown in FIG. 4 and receives the device information of the wireless device 20. When the receipt of the device information of the wireless device 20 is finished, the user ID information generation unit 1090 of the MFP 1000 generates the user ID information by using the device information of the wireless device 20 (S1303). Here, the device information of the wireless device 20 used to generate the user ID information may be exclusive information of the wireless device 20. The host name of the wireless device 20 may be changed, and the IP address is flexible because it may be changed whenever the wireless device 20 is connected to other devices. Thus, a media access control (MAC) address of the wireless device 20 may be the exclusive information of the wireless device 20. In an embodiment, the user ID information is generated by using the MAC address of the wireless device 20. When the user ID information is generated by using the MAC address of the wireless device 20, the generated user ID information is stored (registered) in the user information table 1070 (S1305). In addition, when the user ID information is generated, the generated information may be notified to the user through the user interface unit 1100.

Figure 12:
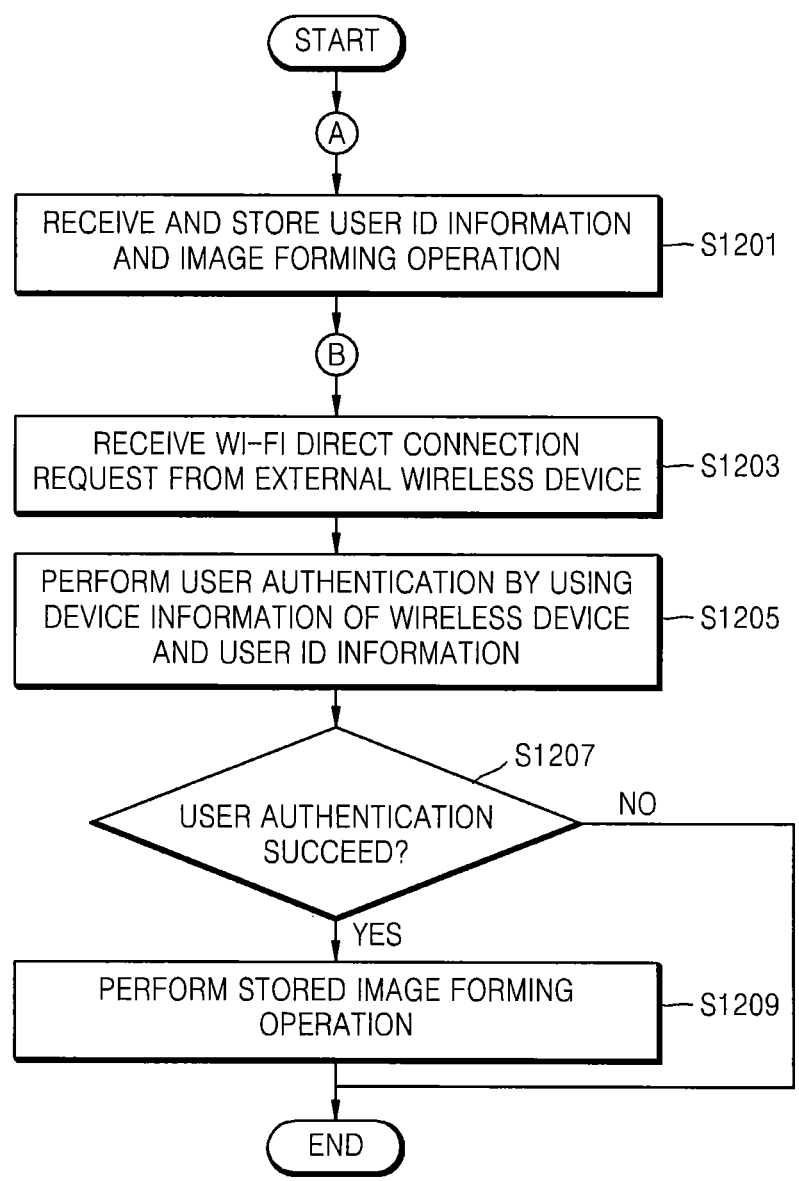
FIGS. 12 through 15 are flowcharts illustrating a method of performing an image forming operation through a user authentication of a multi-function printer supporting the Wi-Fi Direct according to an embodiment.
Figure 14:
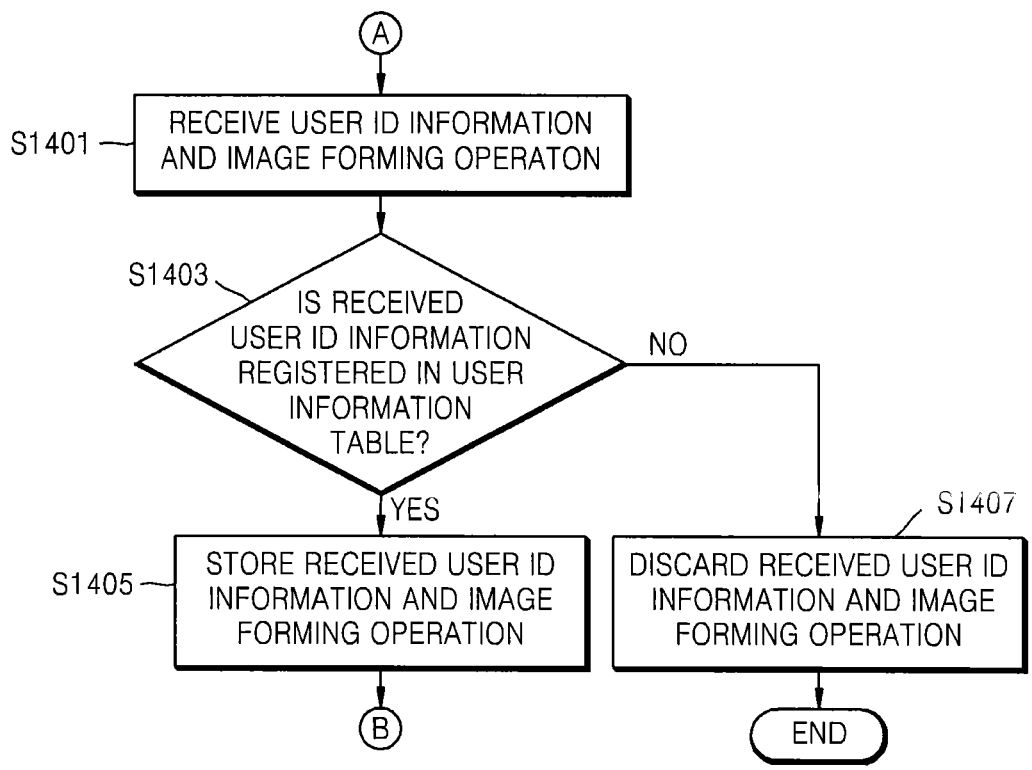

FIG. 14 is a flowchart illustrating sub-processes of operation S1201 shown in FIG. 12, that is, the operation of receiving and storing the user ID information and the image forming operation. The processes shown in FIG. 14 are performed under an assumption that certain user ID information is generated in advance and registered in the user information table. When the operation receipt unit 1060 of the MFP 1000 receives the user ID information and the image forming operation (S1401), the user ID information check unit 1080 checks whether the transmitted user ID information coincides with the user ID information registered in the user information table (S1403). As a result of the checking, when the transmitted user ID information coincides with the user ID information registered in the user information table 1070, the transmitted user ID information and the image forming operation are stored in the operation storage unit 1050 (S1405). However, if the transmitted user ID information does not coincide with the user ID information registered in the user information table 1070, the transmitted user ID information and the image forming operation are discarded (S1407). As described above, if the user ID information that is not registered in the user information table 1070 is received, the user ID information is discarded so as to prevent unnecessary information from being stored in the MFP 1000.

Figure 15:
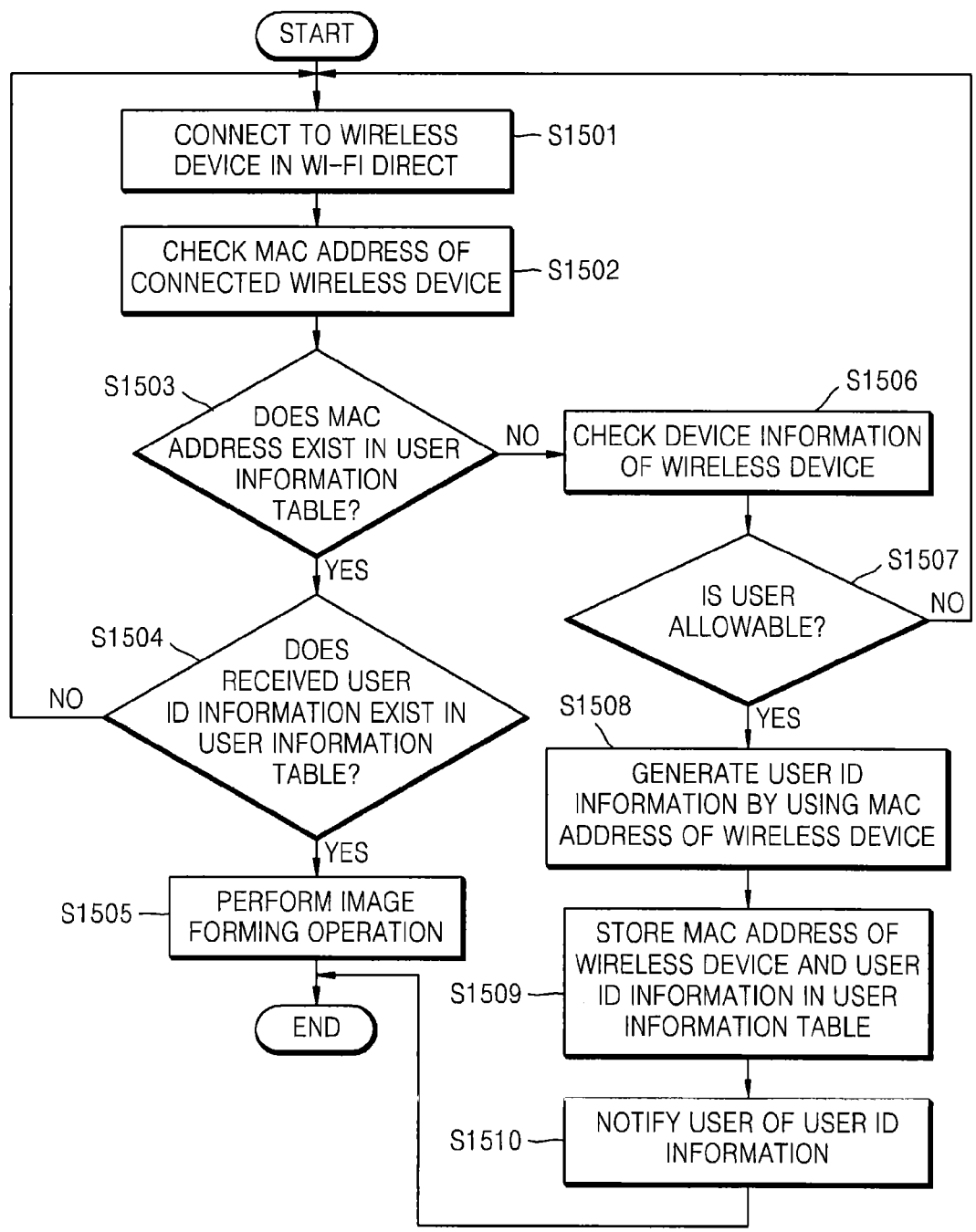

FIG. 15 is a flowchart illustrating processes of executing the image forming operation through the user authentication of the Wi-Fi Direct MFP according to an embodiment. When the wireless device 20 approaches around the MFP 1000, the communication interface unit 1010 of the MFP 1000 receives a Wi-Fi Direct connection request from the wireless device 20, and the wireless device 202 is connected to the communication interface unit 1010 of the MFP 1000 (S1501). When the wireless device 20 is connected to the communication interface unit 1010 of the MFP 1000 in the Wi-Fi Direct connection, the user authentication unit 1020 of the MFP 1000 checks the MAC address of the wireless device 20 (S1502), and checks whether there is the MAC address of the wireless device 20 exists in the user information table 1070 (S1503). If the MAC address of the wireless device 20 exists in the user information table 1070, it is checked whether the received user ID information exists in the user information table 1070 (S1504). In addition, if the user ID information exists in the user information table 1070, the control unit 1030 makes the operation execution unit 1040 perform the image forming operation (S1505).

On the other hand, if there is not the MAC address of the wireless device 20 in the user information table 1070 in operation S1503, the user ID information generation unit 1090 checks the device information of the wireless device 20 (S1506) in order to identify whether the user may use the MFP 1000 (S1507). When it is identified that the user may use the MFP 1000, the user ID information generation unit 1090 generates the user ID information by using the MAC address of the wireless device 20 (S1508), and stores the MAC address of the wireless device 20 and the user ID information in the user information table 1070 (S1509). In addition, the generated user ID information is notified to the user through the user interface unit 1100 (S1510).

Recently, one shared printer has been used by many people in offices, or the like, and thus, secure printing operation has been important. Conventionally, a user authentication method by using a card reader and a card is widely used. In more detail, a user registered as a user in an MFP transmits an image forming operation to the MFP along with the user ID information such as the user ID, and the user touches the card reader provided in the MFP with the card of his/her own to transmit signature stored in the card to the MFP. Through the above processes, the user authentication is performed by identifying the user ID information. However, in the above user authentication process using the card and the card reader, the MFP has to include the card reader and the user has to have the card.

However, according to the method of performing the image forming operation through the user authentication of the MFP supporting the P2P connection, the MFP does not need to include an additional card reader provided that the MFP supports the P2P connection, and the user may perform the user authentication conveniently by approaching to the MFP with a wireless device such as a smartphone, instead of the card for the user authentication. In addition, the above user authentication method is expected to be widely used when the Wi-Fi Direct technology is widely applied to the image forming apparatuses and the smartphones.

In addition, according to the conventional user authentication method using the card and the card reader, the user has to input the user ID information directly through the user interface of the MFP; however, according to a method, the MFP automatically generates the user ID information by using the device information of the wireless device when the wireless device is connected to the MFP in the P2P connection. Thus, the user ID information may be simply generated.

According to one or more embodiments, there is provided the user authentication is performed by using the device information transmitted from the wireless device that is P2P connected to the image forming apparatus, and the image forming operation is performed after succeeding in the user authentication. Thus, the user authentication may be performed conveniently by simply connecting the wireless device to the image forming apparatus.

Embodiments may be recorded in computer-readable media including program instructions (computer readable instructions) to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

While embodiments have been particularly shown and described with reference to drawings, it will be understood by those of ordinary skill in the art that various changes in form and details may be made therein without departing from the spirit and scope of the disclosure as defined by the following claims.

What is claimed is:

1. A method of performing an image forming operation through a user authentication of an image forming apparatus that supports a peer to peer (P2P) connection, the method comprising:

receiving and storing user identification information and an image forming operation by the image forming apparatus;

after storing the user identification information and the image forming operation, receiving a P2P connection request from an external wireless device by the image forming apparatus for P2P connection between the external wireless device and image forming apparatus before user authentication;

after establishing the P2P connection, receiving device information from the external wireless device by the image forming apparatus that is P2P connected to the external wireless device, and performing the user authentication by using the received device information and the stored user identification information; and when the user authentication is successful, performing the image forming operation by the image forming apparatus, wherein the user identification information is generated by using the device information of the external wireless device.

2. The method of claim 1, wherein the image forming apparatus operates as an access point (AP) that allows clients on a wireless local area network (WLAN) to be connected to each other or operates as a client on the WLAN, and the receiving of the P2P connection request includes receiving the P2P connection request from the external wireless device when the image forming apparatus operates as the AP and the external wireless device approaches within a predetermined distance from the image forming apparatus.

3. The method of claim 1, further comprising:
receiving device information of the external wireless device after the image forming apparatus is P2P connected to the external wireless device, and generating the user identification information by using the received device information; and notifying the generated user identification information to the user and registering the user identification information in a user information table, before receiving and storing of the user identification information and the image forming operation.

4. The method of claim 1, further comprising:
receiving the user identification information and the device information of the external wireless device in a state where the image forming apparatus is P2P connected to the external wireless device; and registering the received user identification information in the user information table as information corresponding to the device information, before receiving and storing of the user identification information and the image forming operation.

5. The method of claim 1, wherein the receiving and storing of the user identification information and the image forming operation comprises:
- determining whether the received user identification information coincides with the user identification information registered in a user information table; and
- when the received user identification information is equal to the user identification information registered in the user information table, storing the received user identification information and the image forming operation, and when the received user identification information is not equal to the user identification information registered in the user information table, discarding the received user identification information and the image forming operation.

6. The method of claim 1, wherein when the user authentication fails, generating user identification information by using the device information of the external wireless device, and registering the generated user identification information in a user information table.

7. The method of claim 1, wherein the device information is unique information of the external wireless device.

8. The method of claim 1, wherein the user identification information is equal to the device information.

9. At least one non-transitory computer readable recording medium storing computer readable instructions that control at least one processor for executing the method according to claim 1.

10. An image forming apparatus supporting a peer-to-peer (P2P) connection, the image forming apparatus comprising:
- an operation receiver which receives user identification information and an image forming operation;
- an operation storage unit which stores the image forming operation;
- an operation execution unit which performs the stored image forming operation;
- a communication interface for P2P which connects the image forming apparatus to an external wireless device after the image forming operation is stored in the operation storage unit:
- a user identification information generator which generates the user identification information by using the device information;
- a user authenticator which receives device information from the wireless device that is P2P connected to the communication interface and which performs a user authentication by using the device information and the user identification information,
- wherein the device information is received after P2P communication is established between the image forming apparatus and the external wireless device; and
- a control unit which allows the operation execution unit to perform the image forming operation stored in the operation storage unit, when the user authenticator succeeds in the user authentication.

11. The image forming apparatus of claim 10, wherein the image forming apparatus operates as an access point (AP) that allows clients on a wireless local area network (WLAN) to be connected to each other or operates as a client on the WLAN, and wherein the communication interface receives a P2P connection request from the external wireless device when the image forming apparatus operates as the AP and the external wireless device approaches within a predetermined distance from the image forming apparatus.

12. The image forming apparatus of claim 10, further comprising a user information table, in which the user identification information generated by the user identification information generator is registered.

13. The image forming apparatus of claim 12, further comprising a user identification information checker which determines whether the user identification information received by the operation receiver is registered in the user information table, which stores the received image forming operation receiver in the operation storage unit when the user identification information is registered in the user information table, and which discards the image forming operation when the user identification information is not registered in the user information table.

14. The image forming apparatus of claim 12, wherein when the user authenticator fails the authentication of the user, the user identification information generator generates the user identification information by using the device information of the external wireless device that is P2P connected to the communication interface and registers the user identification information in the user information table.

15. The image forming apparatus of claim 10, further comprising a user interface which displays the user identification information generated by the user identification information generator or receiving the user identification information.

16. The image forming apparatus of claim 10, wherein the device information is unique information of the external wireless device.

17. The image forming apparatus of claim 10, wherein the user identification information is equal to the device information.

* * * * *

UNITED STATES PATENT AND TRADEMARK OFFICE
CERTIFICATE OF CORRECTION

PATENT NO.        : 8,941,854 B2                      Page 1 of 1
APPLICATION NO.   : 13/599213
DATED             : January 27, 2015
INVENTOR(S)       : Jung-jin Park et al.

It is certified that error appears in the above-identified patent and that said Letters Patent is hereby corrected as shown below:

In the Claims

Claim 10, column 15, line 40, delete "unit:" and insert --unit;--, therefor.

Signed and Sealed this
Seventh Day of July, 2015

Michelle K. Lee
*Director of the United States Patent and Trademark Office*